March 7, 1961       J. W. ACKLEY       2,973,905

NOZZLE CONSTRUCTION WITH SCREEN SUPPORT

Filed Feb. 13, 1959

*INVENTOR.*
JOHN W. ACKLEY

BY

ATTORNEYS

United States Patent Office 2,973,905
Patented Mar. 7, 1961

2,973,905

NOZZLE CONSTRUCTION WITH SCREEN SUPPORT

John W. Ackley, Moline, Ill., assignor to Deere & Company, Moline, Ill., a corporation of Delaware Filed Feb. 13, 1959, Ser. No. 793,107

2 Claims. (Cl. 239—123)

The object and general nature of this invention is the provision of a new and improved spray nozzle construction in which the strainer screen is frictionally supported and retained on a screen support so that when the nozzle parts are disassembled, as for cleaning, the screen may readily be shifted relative to or removed entirely from the support.

A further feature of this invention is the provision of a new and improved nozzle construction in which a strainer screen is carried on a screen support that comprises a generally cylindrical head at one end of the support and a cylindrical portion at the other end, the diameters of the head and cylindrical portions being substantially equal to the internal diameter of the strainer screen whereby the latter may be frictionally and releasably carried on the support and retained thereon without the use of screws of other separate retaining means.

Another feature of this invention is the provision of means whereby, when the screen is removed from the support, edges of the latter serve to scrape adhering material off the inside face of the screen.

These and other objects and advantages of this invention will be apparent to those skilled in the art after a consideration of the following detailed description of the preferred structure in which the principles of the invention have been incorporated, taken in conjunction with the accompanying drawings, in which.

Figure 1:
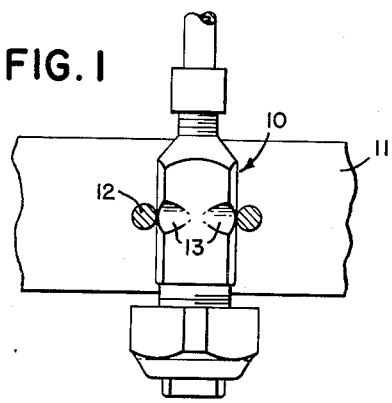
Fig. 1 is an elevation of a nozzle construction embodying this invention and shown as mounted on the frame of a farm implement which is thus made available for use in pre-emergence spraying operation, for example, certain portions being shown in section.

The spray nozzle construction of this invention is indicated at 10 and is illustrated as fixed to the bar 11 of an implement frame by a U-bolt 12. To this end, the generally polygonal exterior portion of the body 10 is provided with recesses 13 to receive the U-bolt 12. The upper end of the body 10 tapers to a threaded section 15 to which a tube 16 bringing liquid to the body 10 is connected. The tube 16 is threaded to the portion of the body 10 by a cap 17 or the like. The tube 16 communicates with the inlet portion 21 of the body 10, the interior portion 22 being generally cylindrical. The body 10 includes an outlet portion 23 against which a nozzle tip 24 is disposed, being held in position by a clamping member 25. The member 25 includes a portion 26 of reduced section that engages a flange 27 on the nozzle tip 24, and the flange 27 engages a flange 29 on a strainer screen support 31, as will best be seen from Fig. 2. The member 31 supports a strainer screen 32 that preferably is in the form of an open end cylinder, that is, the screen 32 is open at both ends.

Figure 5:
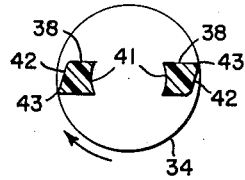
Fig. 5 is a sectional view taken at an enlarged scale, along the line 5—5 of Fig. 3.
Figure 2:
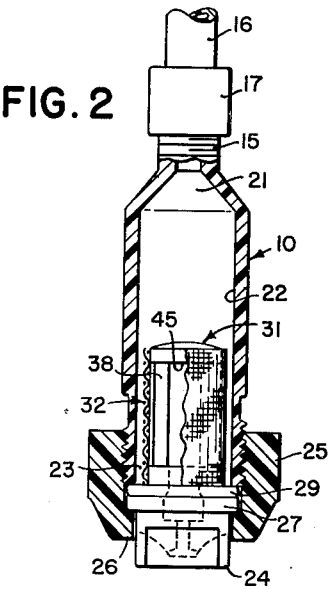
Fig. 2 is a vertical generally central section taken through the nozzle body of the means shown in Fig. 1.
Figure 3:
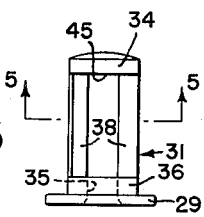
Fig. 3 is an elevation of the strainer screen support shown in Fig. 2.
Figure 4:
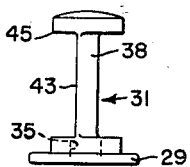
Fig. 4 is an elevation of the strainer screen support, the plane of view lying at a right angle to the plane of view of Fig. 3.

The present invention is particularly concerned with the constructional details of the strainer screen support 31, and as will best be seen from Figs. 3 and 4, the member 31 includes a head 34 disposed at one end of the member 31 while the other end is apertured, as at 35, and carries the flange 29 mentioned above. The apertured portion 35 is formed exteriorly as a cylindrical section 36, and the head 34 is also cylindrical, the diameters of these parts being substantially the same. The head 34 and the cylindrical section 36 are joined by two spaced bars 38 arranged generally diametrically opposite one another with respect to the longitudinal axis of the member 31, as will best be seen from Fig. 5. The inner faces of the bars 38 are curved, as indicated at 41, and at the outer faces 42 are angled as shown in Fig. 5 so as to present a narrow edge 43 for engagement with the inner face of the screen 32 when the latter is mounted on the support 31, as shown in Fig. 2. The internal diameter of the screen 31 is only slightly greater than the diameter of the head 34 and cylindrical portion 36, so that the screen is held frictionally in place on the screen support but is shiftable axially onto and off of the support whenever desired. Also, the screen 32 may be rotated about the cylindrical head 34 and the cylindrical portion 36. As will best be seen in Fig. 5, the narrow edges 43 are so constructed and arranged as to lie in close contact with the inner surface of the associated screen when the latter is mounted on the support 31, as shown in Fig. 2. Thus, whenever the screen is rotated, as in the direction of the arrow shown in Fig. 5, the narrow edges 43 serve to scrape adhering material from the inner face of the screen, thus serving to clean the latter. As mentioned above, the screen 32 may readily be taken off of the support 31 by axial movement for replacement, repair or the like. It will be seen from Fig. 2 that the head 31 closes the associated end of the screen 32 while the other end of the latter communicates through the opening 35 with the outlet end of the nozzle body and the nozzle tip 24, so that liquid flowing from the tube 16 toward the outlet passes through the screen so that dirt particles and the like are prevented from flowing to the tip 24.

In removing the screen 32 from the screen support the interior of the latter is also cleaned by virtue of a relatively sharp or narrow edge 45 at the lower face of the head 34, the edge 45 serving to scrape adhering material as the screen is withdrawn from the screen support.

Figure 6:
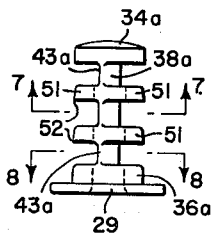
Fig. 6 is an elevation of a modified form of screen support, the plane of view being similar to that of Fig. 4.
Figure 7:
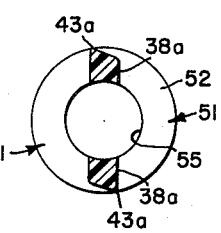
Fig. 7 is a view taken along the line 7—7 of Fig. 6, at an enlarged scale.
Figure 8:
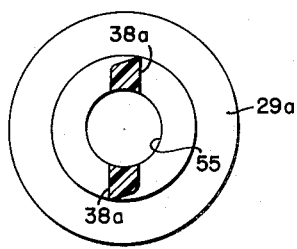
Fig. 8 is an enlarged section taken along the line 8—8 of Fig. 6.

A modified form of screen support is shown in Figs. 6–8. In this form of the invention the screen-closing head is indicated at 34a and the flange portion is indicated at 29a, the diameter of the head 34a being substantially exactly equal to the diameter of the cylindrical section 36a. The head 34a is joined to the cylindrical portion 36a by diametrically opposite bars 38a. In the form of the invention shown in Fig. 6 the bars themselves are interconnected by arcuate portions 51 disposed intermediate the head 34a and the outlet cylindrical portion 36a, thus forming auxiliary screen supports. The arcuate sections 51, taken with the associated portions of the bars 38a, form screen receiving and supporting rings, as will best be seen in Fig. 7. The bars 38a, like the bars 38 shown in Fig. 5, are provided with a screen clearing or scraping edges 43a that function as described above in connection with the bars 38. Also, the arcuate portions 51 have sharp screen scraping edges 52. The outlet opening of the screen support shown in Figs. 6-8 is indicated by the reference numeral 55.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim and desire to secure by Letters Patent is:

1. In a spray nozzle construction having a generally cylindrical body with an inlet opening adjacent one end and an outlet opening at the other end, the improvement comprising a screen support disposable in the outlet opening of said body and comprising a cylindrical portion adjacent one end and a head at the other end, bars extending from said cylindrical portion generally longitudinally of said screen support to said head, and each of said bars having a longitudinally continuous screen engaging narrow edge portion extending longitudinally of said support in contact with said screen, the outer faces of said bars being angled so as to extend divergingly away from a tangent at said narrow edge portion, whereby rotation of the screen on said head and cylindrical portion in a direction away from said diverging portions serves to cause said narrow edges to scrape material off the inside surface and said screen and an open end cylindrical strainer screen having an internal diameter so as to pass over said head and frictionally engage said head and said cylindrical portion.

2. The invention set forth in claim 1, further characterized by separate generally arcuate sections joined to said bars to form spaced apart ring sections between said head and said cylindrical portion, each of said rings also having at the side thereof facing said cylindrical portion sharp screen-scraping edges, the peripheral portions of said rings extending axially divergingly away from said sharp scraping edges and toward said head whereby, when the screen is pulled off the associated support from the head end thereof in a generally axial direction, said sharp scraping edges serve to scrape off material adhering to the inner face of said screen.

References Cited in the file of this patent

UNITED STATES PATENTS

| | | |
|---|---|---|
| 2,396,449 | Wahlin | Mar. 12, 1946 |
| 2,629,632 | Munson | Feb. 24, 1953 |
| 2,639,194 | Wahlin | May 19, 1953 |
| 2,774,631 | Wahlin | Dec. 18, 1956 |